United States Patent [19]

Roberts et al.

[11] 4,258,907

[45] Mar. 31, 1981

[54] WOOD BUCK

[75] Inventors: Russell J. Roberts, Oconto Falls; Kenneth F. Leisner, Oconto, both of Wis.

[73] Assignee: Gem Manufacturing, Inc., Oconto, Wis.

[21] Appl. No.: 122,712

[22] Filed: Feb. 19, 1980

[51] Int. Cl.[3] .............................................. B23Q 1/04

[52] U.S. Cl. ...................................... 269/69; 269/287; 269/296; 269/901

[58] Field of Search ........... 269/296, 133, 69, 321 CF, 269/287; 248/165, 176; 182/224-227, 151

[56] References Cited

U.S. PATENT DOCUMENTS

| | | | |
|---|---|---|---|
| 2,614,779 | 10/1952 | Peterson et al. | 248/176 |
| 2,709,384 | 5/1955 | Harris | 248/176 X |
| 3,041,064 | 6/1962 | Hild | 269/296 X |
| 4,195,828 | 4/1980 | Peterson | 269/287 X |

*Primary Examiner*—Robert C. Watson
*Attorney, Agent, or Firm*—James E. Nilles

[57] ABSTRACT

A wood buck fabricated of tubular steel components which can be easily assembled and disassembled comprises a base pedestal and a log holder removably and adjustably mounted thereon whereby a log to be cut is held in cantilever relationship within an opening defined by an upper log holder member and an axially offset lower log support member, with the base pedestal serving as a counterbalance to prevent tipping.

14 Claims, 4 Drawing Figures

WOOD BUCK

BACKGROUND OF THE INVENTION

1 Field of Use

This invention relates generally to wood bucks or saw bucks and particular to those of a type which can be easily assembled and disassembled and adjusted for use.

2 Description of the Prior Art

Various types of wood bucks or saw bucks are known and available for use for supporting logs while they are being cut into short lengths for use as firewood by means of hand saws or chain saws and the following patents show the statue of this art, as well as related structures. For example, U.S. Pat. No. 179,917 shows a wooden saw buck requiring two end braces and including a treadle-operated holding clamp. U.S. Pat. No. 164,556 shows a tubular steel saw buck but also contemplates two ends. U.S. Pat. No. 1,207,212 shows a hoe clamp in which a garden hoe is held for sharpening in a cantilever-like arrangement but it appears that a special channel head and a movable lever are required to hold the hoe in position. U.S. Pat. Nos. 2,490,858; 1,126,544; 960,916 each show work stands such as are used by plumbers, but each requires the work-piece or pipe to be supported at two end points which are rather widely spaced apart.

SUMMARY OF THE PRESENT INVENTION

In accordance with the present invention, there is provided an improved wood buck or saw buck which is fabricated of lightweight, strong tubular steel components which can be easily assembled for field use and disassembled for transport and storage. The wood buck comprises a two-piece base pedestal and a single-piece log holder removably and adjustably mounted thereon whereby a log to be cut is held in cantilever relationship within an opening defined by an upper log holder member and an axially offset lower log support member forming parts of the log holder, with the base pedestal serving as a counterbalance to prevent tipping. The log holder comprises outwardly extending tubular pivot members which are received within spaced apart tubular cross log pivot holders on the base pedestal. At least one cross log pivot holder has a pin-receiving hole which registers with a selected one of a plurality of differently arranged pin-receiving holes in the assocated pivot member to enable reception of a pivot pin therethrough to lock the log holder in a desired angular position to thereby enable optimum position of a log to be cut. An optionally useable adjustment insert or wedge, preferably molded of plastic, is provided for insertion between the log and the upper log holder member to further immobilize the log during cutting.

A wood buck or saw buck in accordance with the invention offers many advantages over the prior art. For example, the entire unit knocks down into three basic relatively compact components for transport or storage and is easily and quickly assembled for use by means of trouble-free slip joints and loose pins. The basic components are easily and economically fabricated, preferably by welding, from lightweight, strong, commercially available tubular steel. The log holder is easily and quickly adjustably positionable relative to the base pedestal by means of the pins and pin-receiving holes to suit logs of different or irregular shape to thereby facilitate cutting and the optionally useable adjustment insert provides additional rigidity of the log in the log holder if needed. Reliance on the principles of cantilever support eliminates the need for a heavy or weighted base pedestal to provide adequate support and eliminates the need for a pair of opposite end braces as in conventional prior art saw bucks.

Other objects and advantages will hereinafter appear.

DESCRIPTION OF A PREFERRED EMBODIMENT

Figure 1:
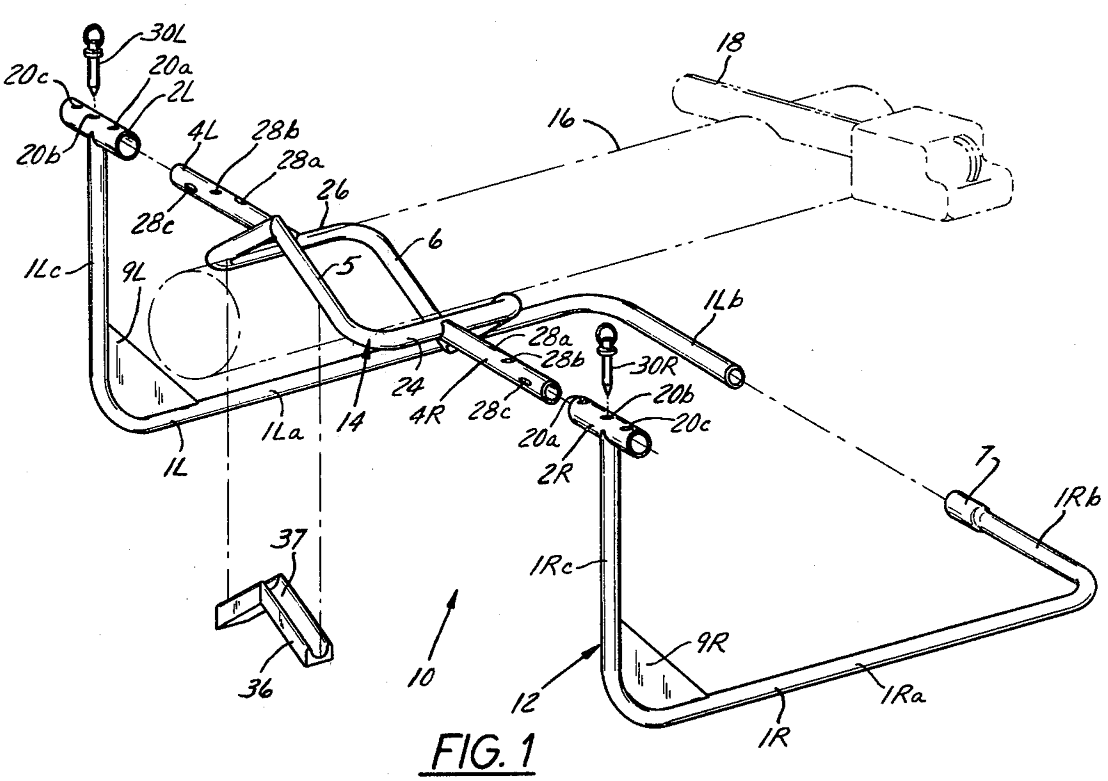
FIG. 1 is an exploded, perspective view of a wood buck or saw buck in accordance with the invention, and showing in phantom lines a log supported therein being cut by a chain-saw.
Figure 2:
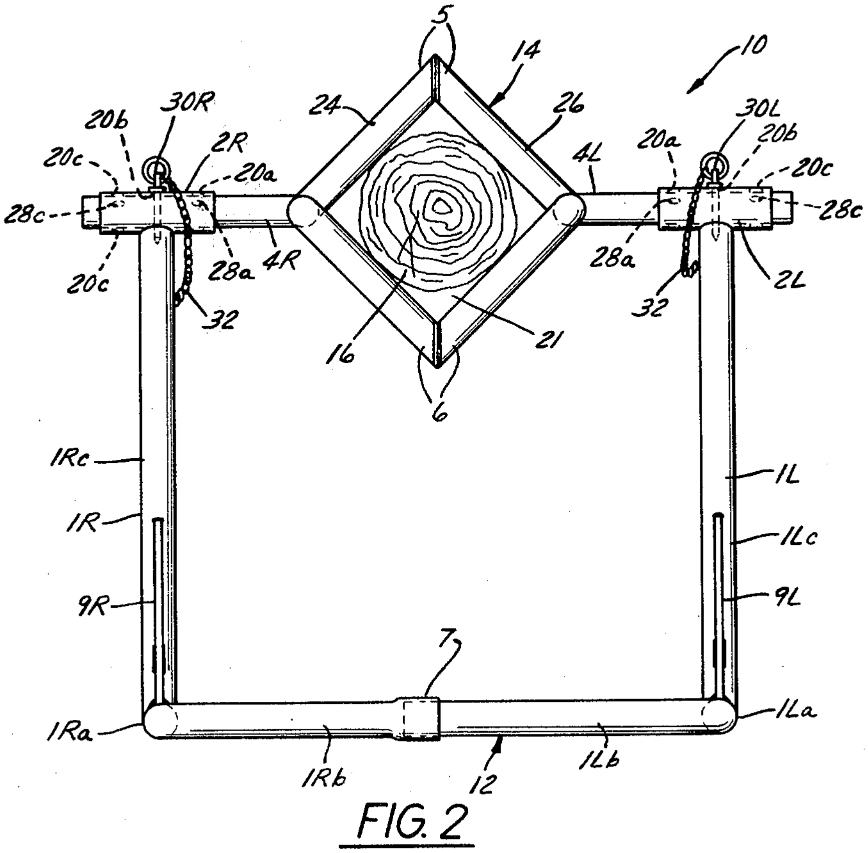
FIG. 2 is an end elevational view of the buck of FIG. 1.
Figure 3:
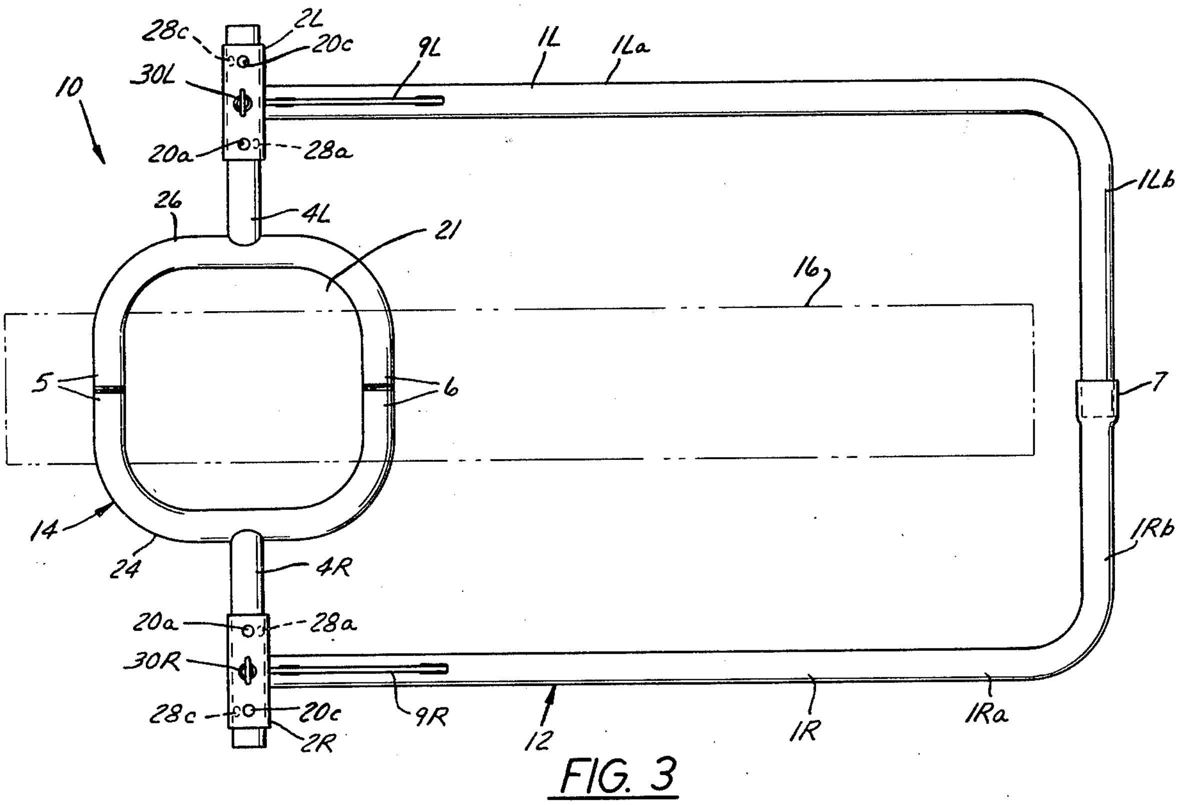
FIG. 3 is a top plan view of the buck of FIG. 1.
Figure 4:
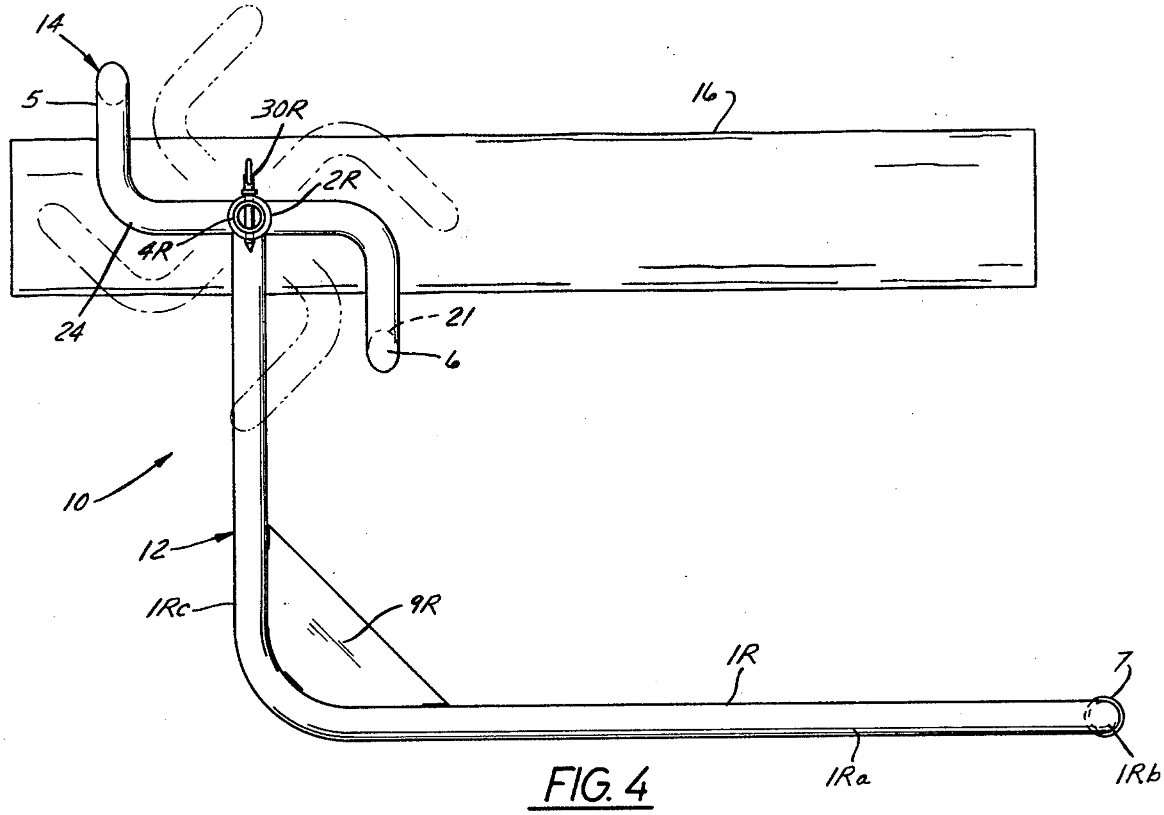
FIG. 4 is a side elevational view of the buck of FIG. 1.

Referring to FIGS. 1 through 4, numeral 10 designates a wood buck or saw buck in accordance with the invention. Wood buck 10 comprises a base pedestal 12 which rests on the ground or other suitable surface and a log holder 14 which is shown as supporting a log 16 in position for cutting by means of a chain saw 18.

Base pedestal 12 comprises two detachably connected components, namely, right and left base uprights 1R and 1L, respectively. Right base upright 1R comprises a generally horizontal ground-engaging portion **1R*a* extending in the same direction as the axis of log 16, a generally horizontal ground-engaging portion 1R*b* integrally connected to one end of portion 1R*a* and extending transversely and inwardly thereof, and a generally vertical portion 1R*c* integrally connected to the other end of portion 1R*a* and extending transversely and upwardly therefrom. A gusset 9R is welded between portions 1R*a* and 1R*c* to rigidify upright 1R. Right base upright 1R further comprises a cross log pivot holder 2R in the form of a short tubular member which is rigidly secured as by welding to the top end of vertical portion 1R*c* and which extends horizontally and transversely relative to portion 1R*a* and log 16. Pivot holder 2R is provided with three spaced apart pin-receiving holes *20a*, *20b*, *20c* which are arranged in a straight line with each other along the axis of pivot holder 2R** and extend therethrough.

It is to be understood that left base upright 1L is constructed in the same manner as right base upright 1R except that its ground-engaging portion **1L*b* extends inwardly toward portion 1R*b* of right base upright 1R. Portion 1R*b* is provided at its inner end with an expanded or flared slip joint 7 for frictionally receiving the inner end of portion 1L*b*** which is of slightly smaller diameter than the slip joint.

Log holder 14, which is mounted on base pedestal 12 when the latter is assembled, comprises an upper log holder member 5 which is rigidly connected to a lower log support member 6 and cooperates therewith to define a log-receiving opening 21 therebetween. The right hand side of upper log holder member 5 and the right hand side of lower log support member 6 are integrally formed by bending from a single tubular member designated 24. Similarly, the left hand side of upper log holder member 5 and the left hand side of lower log support member 6 are integrally formed by bending from a single tubular member designated 26. The members 24 and 26 are welded together at their mating ends. Log holder 14 further comprises outwardly extending right and left log holder pivot members 4R and 4L, respectively, in the form of short tubes which have their inner ends rigidly secured as by welding to members 24 and 26, respectively.

The right and left log holder pivot members 4R and 4L of log holder 14 are received within the pivot holders 2R and 2L, respectively, of base pedestal 12. Pivot member 4R is provided with three spaced apart pin-receiving holes 28*a*, 28*b*, 28*c* which are arranged along the axis of pivot member 4R but angularly spaced apart from each other and extend therethrough. It is to be understood that pivot member 4L is constructed in a similar manner as pivot member 4R.

During assembly of wood buck 10, log holder 14 (see FIG. 4) is rotated to any one of three possible positions relative to base pedestal 2 wherein pin-receiving hole 28*a*, 28*b* or 28*c* in pivot member 4R registers with a respective pin-receiving hole 20*a*, 20*b* or 20*c* in pivot holder 2R and a pin 30R is inserted through the aligned pin-receiving holes to secure log holder 14 against further rotation and maintain it in the desired position. A pin 30L is also inserted into the aligned holes on the left side of the wood buck 10. This arrangement enables log holder 14 and the log 16 therein to assume any one of three angular positions. Thus, a fairly straight log 16 can be held, for example, substantially horizontal or at an angle above or below horizontal to facilitate cutting. Or, a crooked log 16 can thus be optionally positioned or repositioned for cutting. Preferably, pin 30R is secured to base upright 1R by a chain 32 to prevent loss of misplacement.

When log holder 14 is in any of its several possible positions on base pedestal 12, the lower log support member 6 lies or extends below and transversely to the axis of a log to be inserted in log-receiving opening 21 and the upper log holder member 5 is disposed above or vertically spaced from member 6. Furthermore, member 5 is horizontally spaced from member 6 in a direction which is opposite to the direction in which the ground-engaging portions 1R*a* and 1L*a* of base pedestal 12 extend. Thus, when a log 16 is inserted in log-receiving opening 21 and arranged so that the longer (and thus heavier) portion of the log extends in the same direction as the ground-engaging portions 1R*a* and 1L*a* of base pedestal 12 extend, the tendency of the heavier (longer) portion of the log to tilt downward causes the members 5 and 6 of log holder 14 to wedge or bear against and grip the upper and lower sides of the log and support it in a cantilever arrangement.

Since the longer portion of the log 16 overlies and extends in the same direction as the ground engaging portions 1R*a* and 1L*a* of base pedestal 12, the latter cannot tip, provided the weight or force moment of that portion of the log extending beyond the limit defined by portions 1R*b* and 1L*b* of base pedestal 12 does not exceed the weight or force moment on the opposite side of the aforesaid limit.

As FIG. 1 shows, an optionally useable adjustment insert or wedge 36, preferably molded of plastic, is provided for insertion between the upper side of log 16 and the underside of upper log holder member 5 to assist in rigidly securing the log within the opening 21, especially in the case of logs of irregular or odd cross-sectional shape. Wedge 36 is of generally triangular shape and is provided with a semi-circular groove 37 which generally compliments the circular cross-sectional shape of member 5.

In an actual embodiment of wood buck 10 which was found to perform well in actual use, the tubing employed in the various above-described components was on the order of two inches in diameter and had a wall thickness of about 0.093 inches. The ground-engaging horizontally extending portions 1R*a* and 1L*a* of base pedestal 12 were each on the order of 46 inches long and the vertically extending portions 1R*c* and 1L*c* were each on the order of 30 inches high. Each cross log pivot holder 2R and 2L was about 6 inches long and of an inside diameter to enable a slip fit for a two inch outside diameter tube. Log-receiving opening 21 was of such a size as to accommodate a log having a diameter of up to about eight inches.

It is to be understood that log holder 14 could be employed on a base or pedestal or support of a configuration other than that shown and that it could be secured to such base in a manner and by means other than that shown.

We claim:

1. A wood buck comprising, in combination:

a base;

a log holder;

and mounting means for mounting said log holder on said base;

said log holder comprising a pair of upper and lower members which are horizontally and vertically spaced apart from each other and define a log-receiving opening wherein a log is supportable in cantilevered relationship by said members, said mounting means including pivotally interengageable means on said base and on said log holder and forming an axis transverse to a log in said holder, and means for preventing pivotal movement of said log holder relative to said base.

2. A wood buck according to claim 1 wherein said mounting means includes adjustable means for adjustably positioning said log holder in different positions relative to said base whereby a log is supportable in different cantilevered positions.

3. A wood buck according to claim 1 wherein said pivotably interengageable means includes a tubular member on one of said base or said log holder, and further includes another member on the other of said base or said log holder slidably receivable in said tubular member, and wherein said means for preventing pivotably movement includes pin means removably insertable in at least one pair of registering pin-receiving holes in said tubular member and said other member.

4. A wood buck according to claim 3 wherein said means for preventing pivotable movement includes a plurality of pairs of pin-receiving holes so spaced relative to each other that said log holder assumes a different position relative to said base when the holes in a pair are in registry.

5. A wood buck comprising, in combination:

a base comprising a plurality of detachably connectable components;

and a log holder detachably connectable between at least a pair of said components to said base, said log holder comprising a pair of upper and lower members which are horizontally and vertically spaced apart from each other and define a log-receiving opening wherein a log is supportable in cantilever relationship by said members, and pivotally interengageable means on said base and on said log holder and forming an axis transverse to a log in said holder, and means for preventing pivotal movement of said log holder relative to said base.

6. A wood buck according to claim 5 wherein each of said pair of said components of said base comprises a ground-engaging portion and an upright portion and wherein said log holder is connectable between the upright portions of said pair of components.

7. A wood buck according to claim 6 wherein said log holder includes outwardly extending members on opposite sides thereof and wherein the upright portion of each of said pair of components includes a complementary member which is slidably engageable with an outwardly extending member of said log holder.

8. A wood buck according to claim 7 wherein said complementary member includes a recess for receiving said outwardly extending member.

9. A wood buck according to claim 8 wherein said complementary member and said outwardly extending member are relatively rotatable and wherein each includes a pin-receiving hole therein, and further including pin means insertable in said pin-receiving holes when the latter are in registry to prevent relative rotation between said log holder and said base.

10. A wood buck comprising, in combination:

a base comprising a pair of detachably connectable components, each component comprising a ground-engaging portion, an upright portion, a tube on said upright portion extending transversely to at least part of said ground-engaging portion, and means on said ground-engaging portion for detachably connecting said ground-engaging portions to each other;

the tubes on said components being spaced apart from and in axial alignment with each other when said components are connected together;

a log holder detachably connectable to said base between the upright portions of said pair of components, said log holder comprising a pair of upper and lower members which are horizontally and vertically spaced apart from each other and define a log-receiving opening wherein a log is supportable in cantilever relationship by said members;

said log holder further comprising outwardly extending pivot members on opposite sides thereof which are axially aligned with each other, each pivot member being slidably receivable within a tube on one of said components of said base;

and means on said base and on said log holder for preventing pivotal movement of the latter relative to the former.

11. A wood buck comprising, in combination:

a base;

a log holder;

and mounting means for mounting said log holder on said base;

said log holder comprising a pair of upper and lower members which are horizontally and vertically spaced apart from each other and define a log-receiving opening wherein a log is supportable in cantilevered relationship by said members, said mounting means including adjustable means for adjustably positioning said log holder in different positions relative to said base whereby a log is supportable in different cantilevered positions.

12. A wood buck comprising, in combination:

a base comprising a plurality of detachably connectable components, each of said pair of said components of said base comprising a ground-engaging portion and an upright portion and wherein said log holder is connectable between the upright portions of said pair of components, and a log holder detachably connectable between at least a pair of said components to said base, said log holder comprising a pair of upper and lower members which are horizontally and vertically spaced apart from each other and define a log-receiving opening wherein a log is supportable in cantilever relationship by said members, said log holder including outwardly extending members on opposite sides thereof, said upright portion of each of said pair of components including a complementary member which is slideably engageable with an outwardly extending member of said log holder.

13. A wood buck according to claim 12 wherein said complementary member includes a recess for receiving said outwardly extending member.

14. A wood buck according to claim 13 wherein said complementary member and said outwardly extending member are relatively rotatable and wherein each includes a pin-receiving hole therein, and further including pin means insertable in said pin-receiving holes when the latter are in registry to prevent relative rotation between said log holder and said base.

* * * * *